US011625273B1

(12) United States Patent
Elhemali et al.

(10) Patent No.: US 11,625,273 B1
(45) Date of Patent: Apr. 11, 2023

(54) CHANGING THROUGHPUT CAPACITY TO SUSTAIN THROUGHPUT FOR ACCESSING INDIVIDUAL ITEMS IN A DATABASE

(71) Applicant: Amazon Technologies, Inc., Seattle, WA (US)

(72) Inventors: Mostafa Elhemali, Seattle, WA (US); Dolev Ish-am, Kirkland, WA (US); Jonathan L. Meed, Seattle, WA (US); Richard Krog, Bainbridge Island, WA (US); Adel Gawdat, Seattle, WA (US); Kai Zhao, Seattle, WA (US); Saumil Ramesh Hukerikar, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 16/199,037

(22) Filed: Nov. 23, 2018

(51) Int. Cl.
*G06F 9/50* (2006.01)
*G06F 16/21* (2019.01)

(52) U.S. Cl.
CPC .......... *G06F 9/5016* (2013.01); *G06F 9/5083* (2013.01); *G06F 16/214* (2019.01); *G06F 2209/501* (2013.01); *G06F 2209/5014* (2013.01)

(58) Field of Classification Search
CPC .... G06F 9/5016; G06F 16/214; G06F 9/5083; G06F 2209/5014; G06F 2209/501
See application file for complete search history.

(56) References Cited

U.S. PATENT DOCUMENTS

| | | | |
|---|---|---|---|
| 7,716,180 B2 | 5/2010 | Vermeulen et al. | |
| 7,801,912 B2 | 9/2010 | Ransil et al. | |
| 8,234,650 B1 | 7/2012 | Eppstein et al. | |
| 8,386,540 B1 | 2/2013 | McAlister et al. | |
| 9,052,831 B1 | 6/2015 | Stefani et al. | |
| 9,128,965 B1* | 9/2015 | Yanacek | G06F 16/2282 |
| 10,025,673 B1* | 7/2018 | Maccanti | G06F 11/1458 |
| 10,102,230 B1* | 10/2018 | Muniswamy Reddy | G06F 16/2228 |
| 10,146,814 B1* | 12/2018 | Gupta | G06F 16/284 |
| 10,409,648 B1* | 9/2019 | Bhatia | G06F 9/5027 |
| 10,712,950 B2 | 7/2020 | Stefani et al. | |
| 10,877,669 B1 | 12/2020 | Sivasubramanian et al. | |
| 11,402,825 B2* | 8/2022 | Fujitsuka | G06Q 10/06 |
| 2002/0032816 A1 | 3/2002 | Bakke et al. | |

(Continued)

OTHER PUBLICATIONS

Examiner Lu, Search note on throughput, google search, Aug. 2020 (Year: 2020).*

(Continued)

*Primary Examiner* — Lewis A Bullock, Jr.
*Assistant Examiner* — Kevin X Lu
(74) *Attorney, Agent, or Firm* — S. Scott Foster; Kowert, Hood, Munyon, Rankin & Goetzel, P.C.

(57) ABSTRACT

Throughput capacity may be changed to sustain throughput for accessing individual items in a database. A table hosted at storage nodes that provide access to the table in a database may be identified as allocated with a client-specified throughput capacity for accessing the table. Performance of access requests to the table at the storage nodes may be tracked. Based on the performance of the access requests, a change may be determined that modifies a throughput capacity for the table to sustain a guaranteed throughput for each access request independent of other access requests received for the table.

19 Claims, 11 Drawing Sheets

(56) References Cited

U.S. PATENT DOCUMENTS

| | | | |
|---|---|---|---|
| 2004/0003087 A1 | 1/2004 | Chambliss et al. | |
| 2004/0243692 A1 | 12/2004 | Arnold et al. | |
| 2006/0190243 A1 | 8/2006 | Barkai et al. | |
| 2007/0168336 A1 | 7/2007 | Ransil et al. | |
| 2008/0063165 A1 | 3/2008 | Gallant | |
| 2009/0172782 A1 | 7/2009 | Taglienti et al. | |
| 2010/0017545 A1 | 1/2010 | Gildfind et al. | |
| 2010/0107013 A1* | 4/2010 | Mopur | H04L 43/16 714/37 |
| 2010/0281027 A1 | 11/2010 | Duan et al. | |
| 2011/0055156 A1 | 3/2011 | Roberts et al. | |
| 2011/0270968 A1 | 11/2011 | Salsburg et al. | |
| 2012/0330954 A1* | 12/2012 | Sivasubramanian | H04L 67/02 707/737 |
| 2013/0014119 A1* | 1/2013 | Rowles | G06F 9/5011 718/104 |
| 2015/0269239 A1* | 9/2015 | Swift | G06F 16/27 707/610 |
| 2016/0088485 A1* | 3/2016 | Guo | H04W 28/16 370/329 |
| 2016/0092545 A1* | 3/2016 | Shivarudraiah | G06F 16/24554 707/600 |
| 2017/0315838 A1* | 11/2017 | Nidugala | H04L 67/1095 |
| 2019/0362004 A1* | 11/2019 | Oks | G06F 9/5005 |

OTHER PUBLICATIONS

"Windows Azure Table", Jai Haridas, et al., May 2009, pp. 1-42.

"Windows Azure Storage—Essential Cloud Storage Services", Professional Developers Conference, 2008, Brad Calder, pp. 1-64.

Dynamo: Amazon's Highly Available Key-value Store, G. DeCandia, D. Hastorun, M. Jampani, G. Kakulapati, A. Lakshman, S. Sivasubramanian, P. Vosshall, and W. Vogels, in SOSP '07, pp. 205-220.

\* cited by examiner

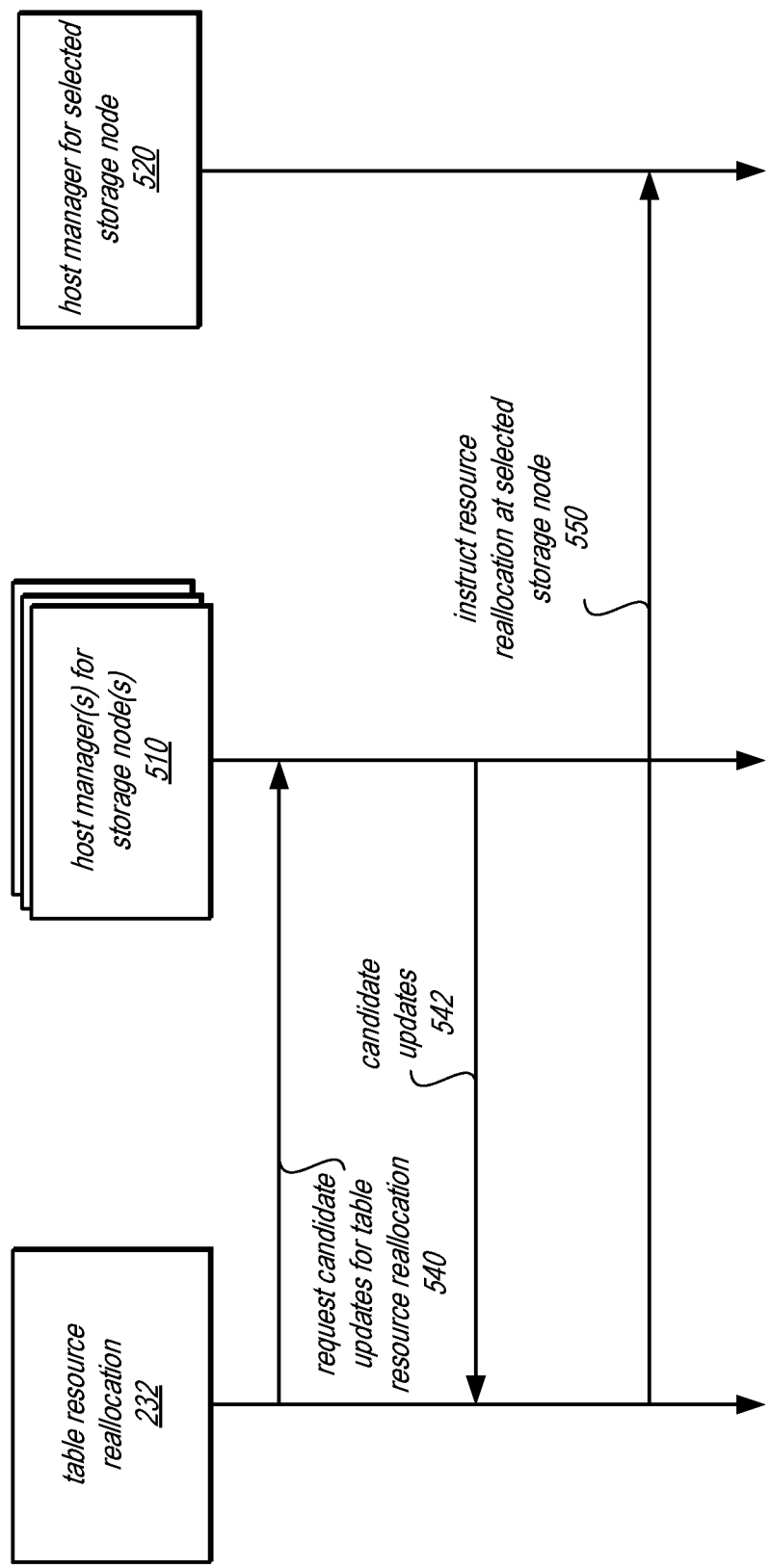

US 11,625,273 B1

CHANGING THROUGHPUT CAPACITY TO SUSTAIN THROUGHPUT FOR ACCESSING INDIVIDUAL ITEMS IN A DATABASE

BACKGROUND

In order to respond to changing conditions or workloads, various kinds of processing environments may rely upon scale out techniques to distribute work amongst additional nodes or merge techniques to distribute work among fewer nodes. For example, as the demands upon various processing resources of a single node increase beyond the capacity of the node to perform according to a desired standard, an additional node may take over some of the workload from the original node so that the performance standard may be maintained. Given that scale out and merge techniques may be widely applicable, improvements to the performance of such techniques are desirable.

BRIEF DESCRIPTION OF THE DRAWINGS

FIG. 5 is a sequence diagram illustrating interactions to dynamically modify resource allocations for a partition, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of changing throughput capacity to sustain throughput for accessing individual items in a database are described herein. In order to achieve optimal performance, client applications that utilize a database may depend upon the data to provide a consistent level of performance. Because database performance may be dependent on the resources allocated to serving database requests, client-specified performance for features such as throughput capacity (e.g., Input/Output Operations per Second (IOPs)) have been used to ensure that sufficient resources are allocated to meet desired performance.

Actual workloads on database systems may vary. High utilization may be quickly followed with low utilization for extended periods of time. In order to procure resources that will meet performance objects in the high or peak utilization time frames, resources can sit idle or underutilize for large periods of time leading to resource waste. Instead of a specified throughput capacity for an entire database or table, throughput capacity may be changed to sustain throughput for accessing individual items in a database without relying upon a client-specified throughput, in some embodiments. In this way, provisioning problems are not offloaded onto client application designers but can be efficiently managed inside of the database system directly.

Figure 1:
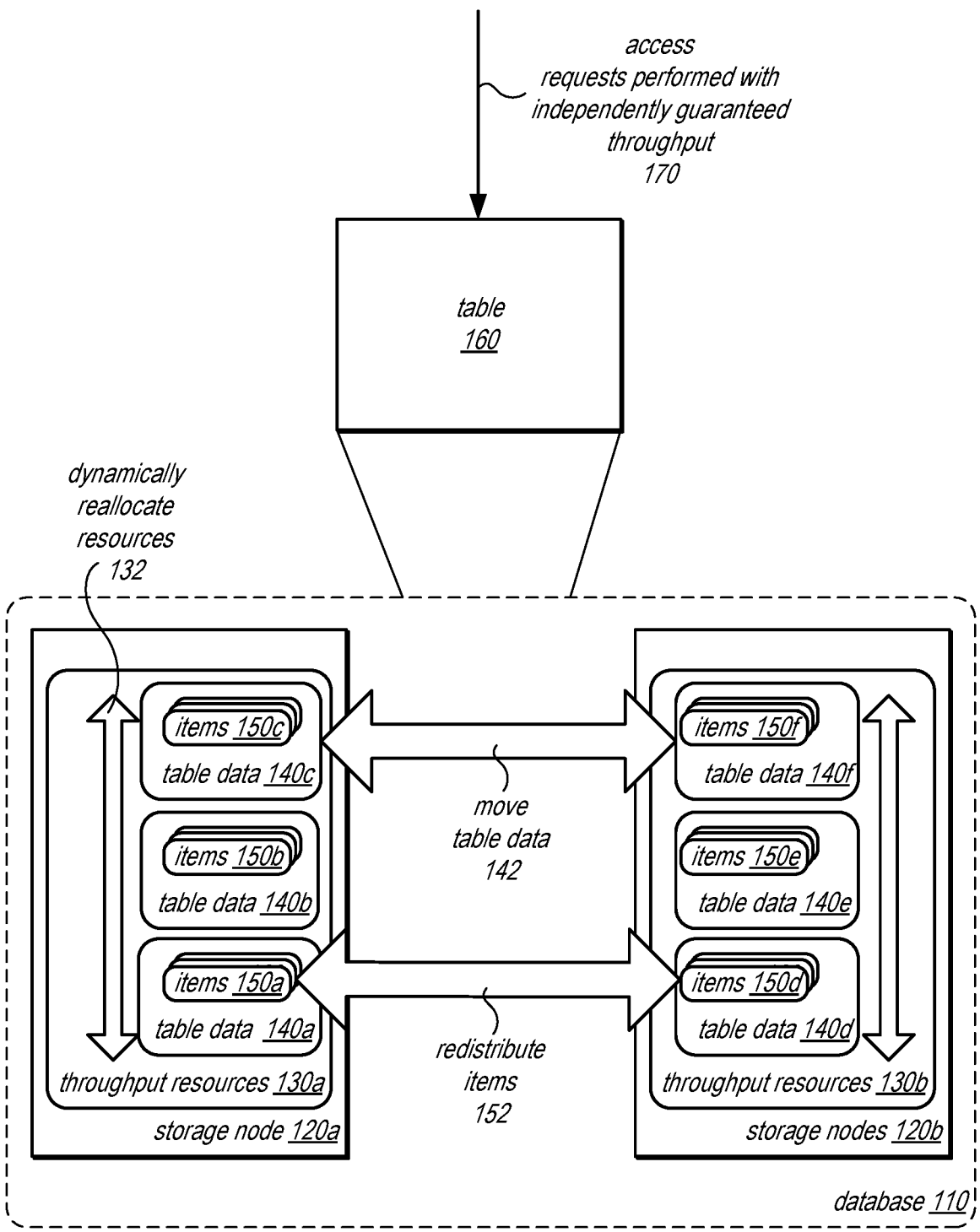
FIG. 1 is a logical block diagrams illustrating changing throughput capacity to sustain throughput for accessing individual items in a database, according to some embodiments.

FIG. 1 is a logical block diagrams illustrating changing throughput capacity to sustain throughput for accessing individual items in a database, according to some embodiments. Database 110 may implement storage nodes, such as storage nodes 120*a* and 120*b* which may host database tables, such as table 160. Table data for these tables, such as table data 140*a*, 140*b*, 140*c*, 140*d*, 140*e*, and 140*f* may include one or more items (e.g., rows, objects, attributes, values, etc.), such as items 150*a*, 150*b*, 150*c*, 150*d*, 150*e*, and 150*f*. Instead of utilizing a client-specified throughput capacity to provide a guaranteed performance for clients of table 160, database 110 may utilize different operations to distribute workload so that each access request 170 (e.g., requests to read from or write table 160, or update table 160 configuration, schema, or other table metadata) may be guaranteed to be performed with independently guaranteed throughput.

For example, instead of waiting until a signal or indication that access requests are being slowed, dropped, or otherwise throttled for table 160, database 110 may proactively evaluate the allocation of throughput resources, such as throughput resources 130*a* and 130*b* at storage nodes 120*a* and 120*b* so as to dynamically reallocated resources 132 (e.g., according to a reallocation technique discussed below with regard to FIGS. 5 and 9). In this way, a request that is received for table 150 can have resources reallocated dynamically to ensure that the request is performed. Similarly, frequently accessed items 150 that cause a workload of a storage node to be high enough to risk meeting the guaranteed performance per item may be redistributed 152 to different storage nodes (e.g., according to a split technique discussed below with regard to FIGS. 6 and 10). For example, items may be redistributed 152 down to the individual item so that an item that receives a high volume of access requests can be provided with maximal resources to meet guaranteed throughput to the item. Like moving table data 142 discussed below, redistribution of items can balance workloads across storage nodes 120 of database 110.

To make space available for changing resource allocations and redistributing items, database 110 may move table data 142 (e.g., one partition or entire table, or replica thereof) to a different storage node, to free resources. The table data move 142 can place table data on an underutilized or less utilized storage node in order to balance workloads across storage nodes 120 of database 110.

Please note that previous descriptions of changing database resource allocations, redistributing items, and moving table data are not intended to be limiting, but are merely provided as logical examples. Different implementations of storage nodes, databases, and tables may be considered.

This specification begins with a general description of a provider network that may implement a database service that may perform changing throughput capacity to sustain throughput for accessing individual items in a database, in one embodiment. Then various examples of a database service are discussed, including different components/modules, or arrangements of components/module, that may be employed as part of implementing the database service, in one embodiment. A number of different methods and techniques to implement changing throughput capacity to sustain throughput for accessing individual items in a database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
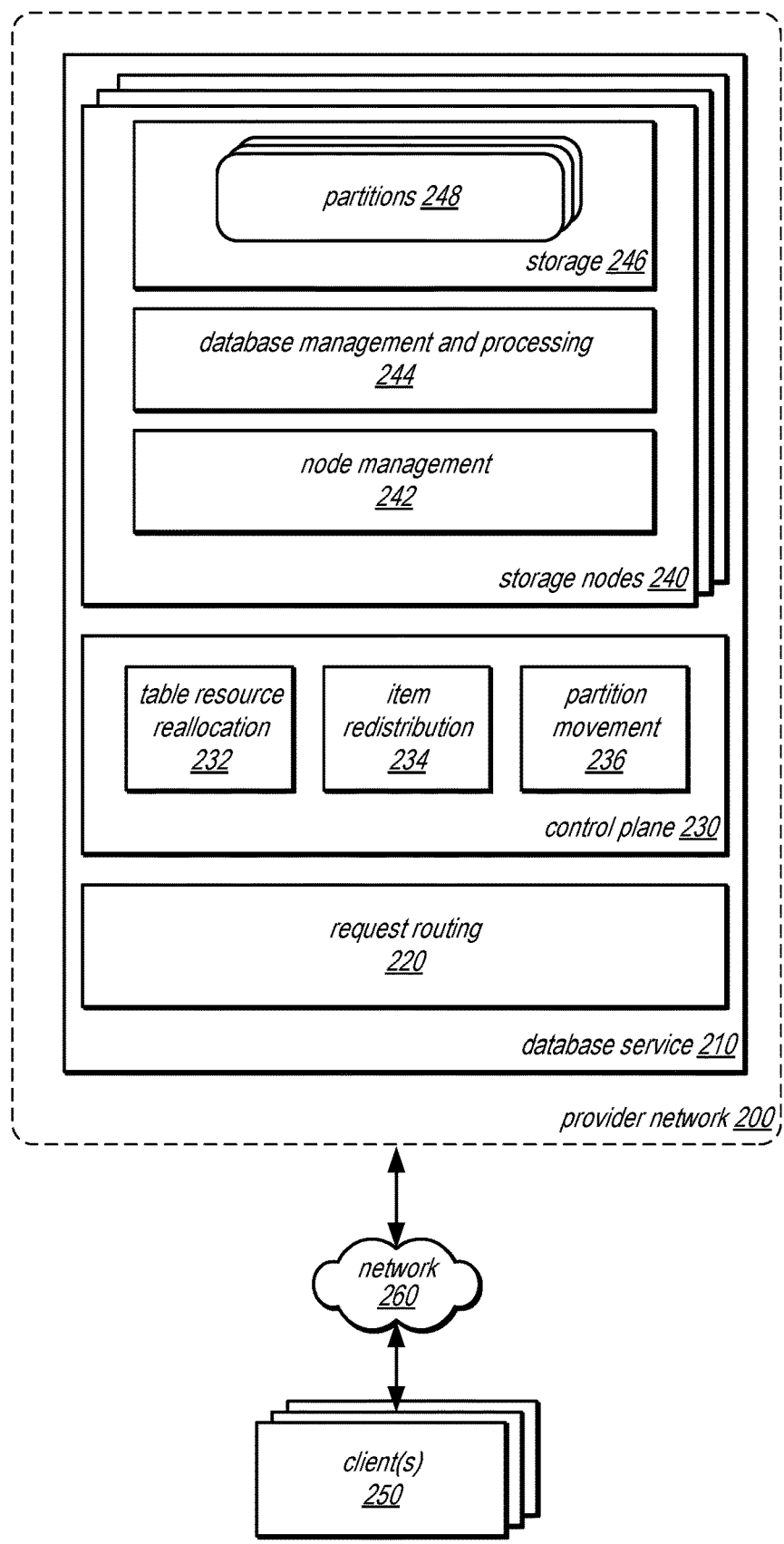
FIG. 2 is a logical block diagram illustrating a provider network that implements a database service which may change throughput capacity to sustain throughput for accessing individual items in a database, according to some embodiments.

FIG. 2 is a logical block diagram illustrating a provider network that implements a database service which may change throughput capacity to sustain throughput for accessing individual items in a database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network 200. In one embodiment, provider network 200 may implement various computing resources or services, such as database service(s) 210 (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 12 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (relational services and/or non-relational services) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of processing nodes that implement map reduce functionality over data stored in one of data storage services 220. Various other distributed processing architectures and techniques may be implemented by database service(s) 210 (e.g., grid computing, sharding, distributed hashing, etc.) in another embodiment.

In one embodiment, clients 250 may encompass any type of client configurable to submit network-based requests to provider network 200 via network 260, including requests for database service(s) 210 (e.g., to query a database 210) or data storage service(s) (e.g., a request to create, read, write, obtain, or modify data in data storage service(s), etc.). For example, in one embodiment a given client 250 may include a suitable version of a web browser, or may include a plug-in module or other type of code module configured to execute as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200, in one embodiment. In one embodiment, client 250 may be configured to generate network-based services requests according to a Representational State Transfer (REST)-style network-based services architecture, a document- or message-based network-based services architecture, or another suitable network-based services architecture.

In one embodiment, a client 250 may be configured to provide access to provider network 200 to other applications in a manner that is transparent to those applications. For example, client 250 may be configured to integrate with a database on database service(s) 210. In such an embodiment, applications may not need to be modified to make use of the storage system service model. Instead, the details of interfacing to the database service(s) 210 may be coordinated by client 250.

Clients 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in one embodiment, clients 250 may communicate with provider network 200 using a private network rather than the public Internet.

Database service 210 may implement request routing 220, in one embodiment. Request routing may be configured to receive, authenticate, parse, throttle and/or dispatch service requests, among other things, in one embodiment. In one embodiment, database service 210 may implement control plane 230 to implement one or more administrative components, such as automated admin instances which may be configured to provide a variety of visibility and/or control functions, as described in more detail herein). In one embodiment, database service 210 may also implement a plurality of storage nodes 240, each of which may manage one or more partitions 248 of a table (e.g., a non-relational database table) on behalf of clients/users or on behalf of the data storage service (and its underlying system) which may be stored in storage 246 (on storage devices attached to storage nodes 240) or, in another embodiment, one or more partitions in external storage which may be accessed by storage nodes 330 via network connections (not illustrated).

Control plane 230 may provide visibility and control to system administrators, as well as various automated features, in some embodiments. In one embodiment, control plane 230 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 230 may provide an interface or access to information stored about one or more detected control plane events, in one embodiment.

Control plane 230 may be configured to direct the performance of different types of control plane operations among the nodes, systems, or devices implementing database service 210, in one embodiment. For instance, control plane 230 may be configured to communicate with storage nodes 240 to initiate the performance of various control plane operations, such as moves, splits, update tables, delete tables, create indexes, etc. . . . In one embodiment, control plane 230 may be configured to update a task registry (or some other table or data structure) with the status, state, or performance information of the control plane operations currently being performed. Control plane 230 may detect, direct, or otherwise instigate operations to support a guaranteed performance for access to individual items in a table, as implemented by table resource reallocation 232, item redistribution 234, and partition movement 236, discussed below with regard to FIGS. 5-11.

In one embodiment, request routing 220 may support handling requests formatted according to an interface to support different types of web services requests. For example, in one embodiments, database service 210 may be configured to implement a particular web services application programming interface (API) that supports a variety of operations on tables (or other data objects) that are maintained and managed on behalf of clients/users by the data storage service system (and/or data stored in those tables). In one embodiment, database service 210 may be configured to support different types of web services requests. For example, in one embodiments, database service 210 may be configured to implement a particular web services application programming interface (API) that supports a variety of operations on tables (or other data objects) that are maintained and managed on behalf of clients/users by the data storage service system (and/or data stored in those tables). In one embodiment, request routing 220 may perform parsing and/or throttling of service requests, authentication and/or metering of service requests, dispatching service requests, and/or maintaining a partition assignments that map processing nodes to partitions.

Storage nodes 240 may implement database management and processing 244, in one embodiment. Database management and processing 244 may create, update, define, query, and/or otherwise administer databases, in one embodiment. For instance, database management and processing 244 may maintain a database according to a database model (e.g., a relational or non-relational database model). In one embodiment, database management 3 and processing 24440 may allow a client to manage data definitions (e.g., Data Definition Language (DDL) requests to describe column definitions, requests to add item attributes, etc.). In one embodiment, database management and processing 244 may handle requests to access the data (e.g., to insert, modify, add, or delete data as well as requests to query for data by generating query execution plans to determine which partitions of a database may need to be evaluated or searched in order to service the query). In one embodiment, database management and processing 244 may also perform other management functions, such as enforcing access controls or permissions, concurrency control, or recovery operations. In one embodiment, database management and processing 244 may implement a storage engine to access partitions 248 in order to process access requests (e.g., requests to read or scan different partitions or particular items or parts of data within a partition).

In one embodiment, database management and processing 244 may implement a storage engine to access either internal storage 246 and/or external storage. The storage engine may perform requests on behalf of database management and processing 244 to create, read, update and delete (CRUD) data in a partition, in one embodiment. The storage engine may implement buffers, caches, or other storage components to reduce the number of times storage is accessed, in one embodiment.

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more processing nodes 330 process access requests on behalf of clients directed to tables. Some of these processing nodes may operate as if they were in a multi-tenant environment, and others may operate as if they were in a single-tenant environment. In one embodiments, processing nodes 330 that operate as in a multi-tenant environment may be implemented on different processing nodes (or on different virtual machines executing on a single host) than processing nodes that operate as in a single-tenant environment.

Figure 3:
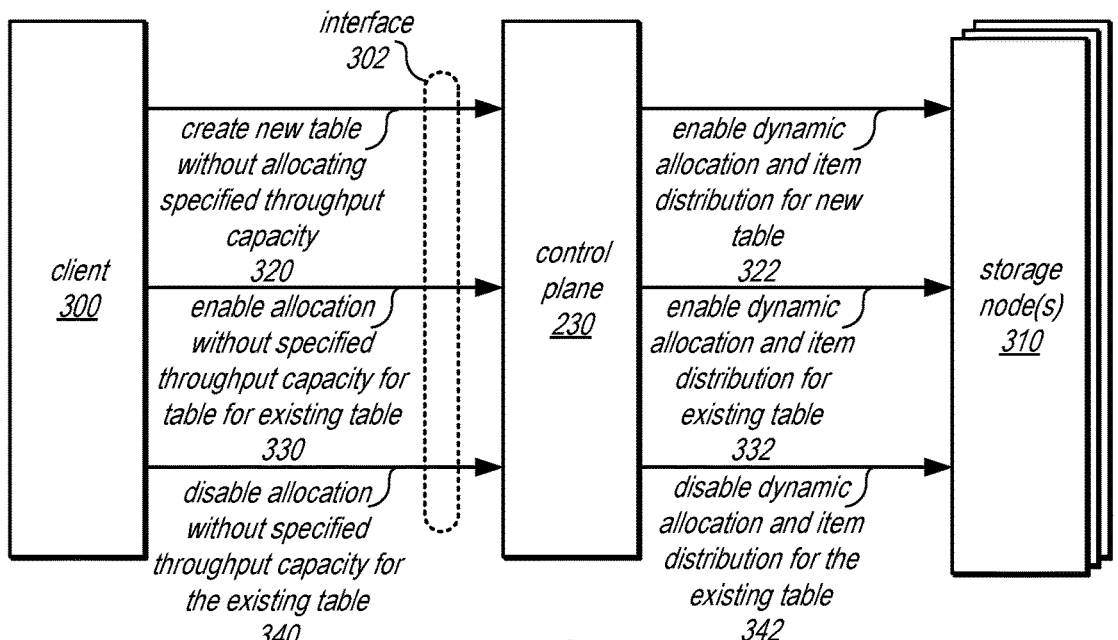
FIG. 3 is a logical block diagram that illustrates an interface for a control plane of a database service to identify tables as allocated without a specified throughput capacity, according to some embodiments.

FIG. 3 is a logical block diagram that illustrates an interface for a control plane of a database service to identify tables as allocated without a specified throughput capacity, according to some embodiments. Client 300 may be a client like client 250 as discussed above or a client internal to provider network 200 (e.g., implemented on another service of provider network 200 not illustrated). Client 300 may submit requests via interface 302 (which may be a programmatic interface, like an API, a graphical user interface (GUI), and/or a command line interface) to create a new table without allocating a specified throughput capacity. A flag, identifier, or other value may indicate the type of table or a value '0' could be included in a provisioned throughput capacity field, in some embodiments. The request may trigger control plane 230 to enable dynamic resource allocation and item distribution 322 for the new table (e.g., after an initial allocation of one or more storage nodes to store the new table).

In some embodiments, a client 300 can submit a request to enable allocation without specified throughput capacity for an existing table, as indicated at 330. Control plane 230 can then enable dynamic allocation and item distribution 332 for the existing table, in some embodiments. This request could be implemented as a request to change an accounting model or structure for a table, as discussed below. A request to disable 340 the allocation without specified throughput capacity for the existing table. For example, a request to change to another accounting model could be submitted that disables allocation without specified throughput capacity. Control plane 230 may disable dynamic allocation and item distribution for the existing table 342 in response to the request.

Figure 4A:
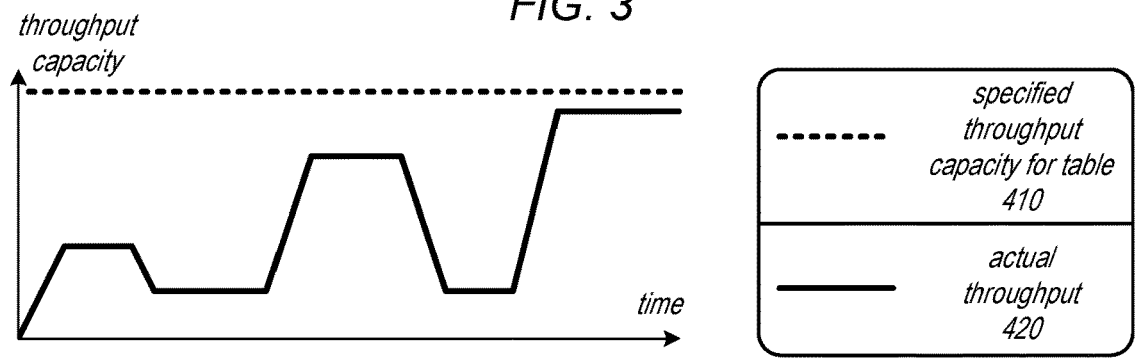
FIGS. 4A-4C illustrate different throughput capacity provisioning options for a table hosted in a database service, according to some embodiments.
Figure 4B:
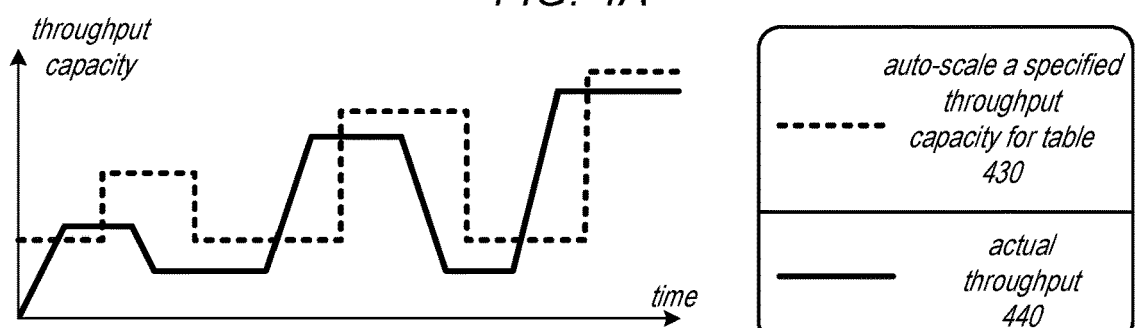
Figure 4C:
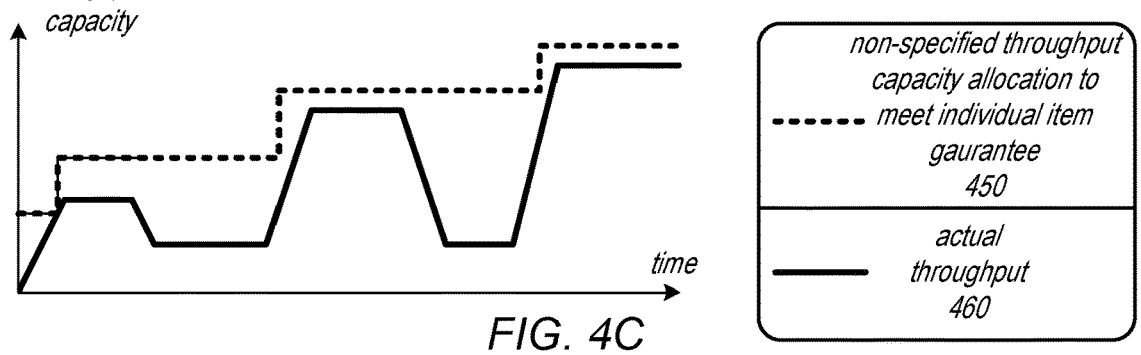

FIGS. 4A-4C illustrate different throughput capacity provisioning options for a table hosted in database service 210. In FIG. 4A, a specified throughput 410 for a table may be provided so that as actual throughput 420 changes, enough throughput capacity remains to prevent access from being throttled, slowed, or otherwise under perform. The waste of resources is likely greatest in a specified throughput provisioning option for spiky or unpredictable workloads as provisioning may be done for a "worst case" workload scenario so that throughput capacity is often redundant or unneeded. FIG. 4B illustrates an auto-scaled version of a specified throughput capacity 430 compared to an actual throughput utilization 440. Such a feature can eliminate waste but because provisioning is adjusted for table performance, there may be times (as illustrated) where a change in actual throughput 440 exceeds the provisioned throughput 430.

In FIG. 4C, throughput is not specified for a table, as discussed above with regard to FIG. 3. Instead, non-specified throughput capacity allocation 450 is dynamically changed according to the various techniques discussed below to meet a performance guarantee for individual items so that no access request is dependent upon the performance of another access request. In FIG. 4C, actual throughput never outpaces the capacity allocation 450 to meet the actual throughput.

In some embodiments, the various provisioning options may be tied to different accounting models for tracking resource usage. For example, the specified throughput models of FIGS. 4A and 4B may account for usage of database service 210 according to provisioned throughput capacity, so that access requests are accounted for—not provisioned capacity—which may sometimes be referred to as "pay-per-use" or "pay-per-request" model. Non-specified throughput capacity may be implemented to account for only those requests that are performed. Because throughput capacity allocation can be narrowly tailored to actual throughput, usage could only be tracked on a per request/use basis (without account for allocated resources), reducing costs for a client application. In some embodiments, the non-specified throughput capacity allocation may be enabled when a request to use the corresponding accounting model is received. Moreover, a table can appear to have limitless scale in size and throughput capacity (from the perspective of the client application) because provisioned capacity is not reported to or controlled by a client application. Instead, a guarantee may be maintained that sufficient throughput capacity will be provisioned to treat any number of incoming access requests as appropriately provisioned for.

FIG. 5 is a sequence diagram illustrating interactions to dynamically modify resource allocations for a partition, according to some embodiments. Table resource reallocation 232 may implement a pull-based technique for retrieving information to make partition movement decisions. For example, table resource reallocation 232 may request 540 candidate updates for table resource reallocation from the host manager(s) of storage node(s) 510. However, in other embodiments, a push-based technique may be used to automatically provide resource utilization information. Host manager(s) for storage node(s) 510 may perform various techniques to identify whether a partition could be beneficially split, such as by applying the techniques discussed below with regard to FIG. 7.

Host manager(s) for storage node(s) 510 may then provide a set of candidate updates 542 to table resource reallocation. Table resource reallocation 232 may perform various further techniques to filter, order, or otherwise arrange the performance of candidate updates to resource allocation in tables (e.g., in terms of priority to make the most needed reservation changes, to throttle or limit the number of reservation changes performed by the service overall, etc.). Table resource reallocation 232 may then instruct 550 the host manager for a selected storage node 520 to perform the reallocation at the selected storage node. For example, host manager for selected storage node 520 may update internal resource allocation configuration (e.g., increase a request token bucket size for the partition of the table, increase processor, I/O bandwidth, and/or network bandwidth for the partition of the table).

Figure 6:
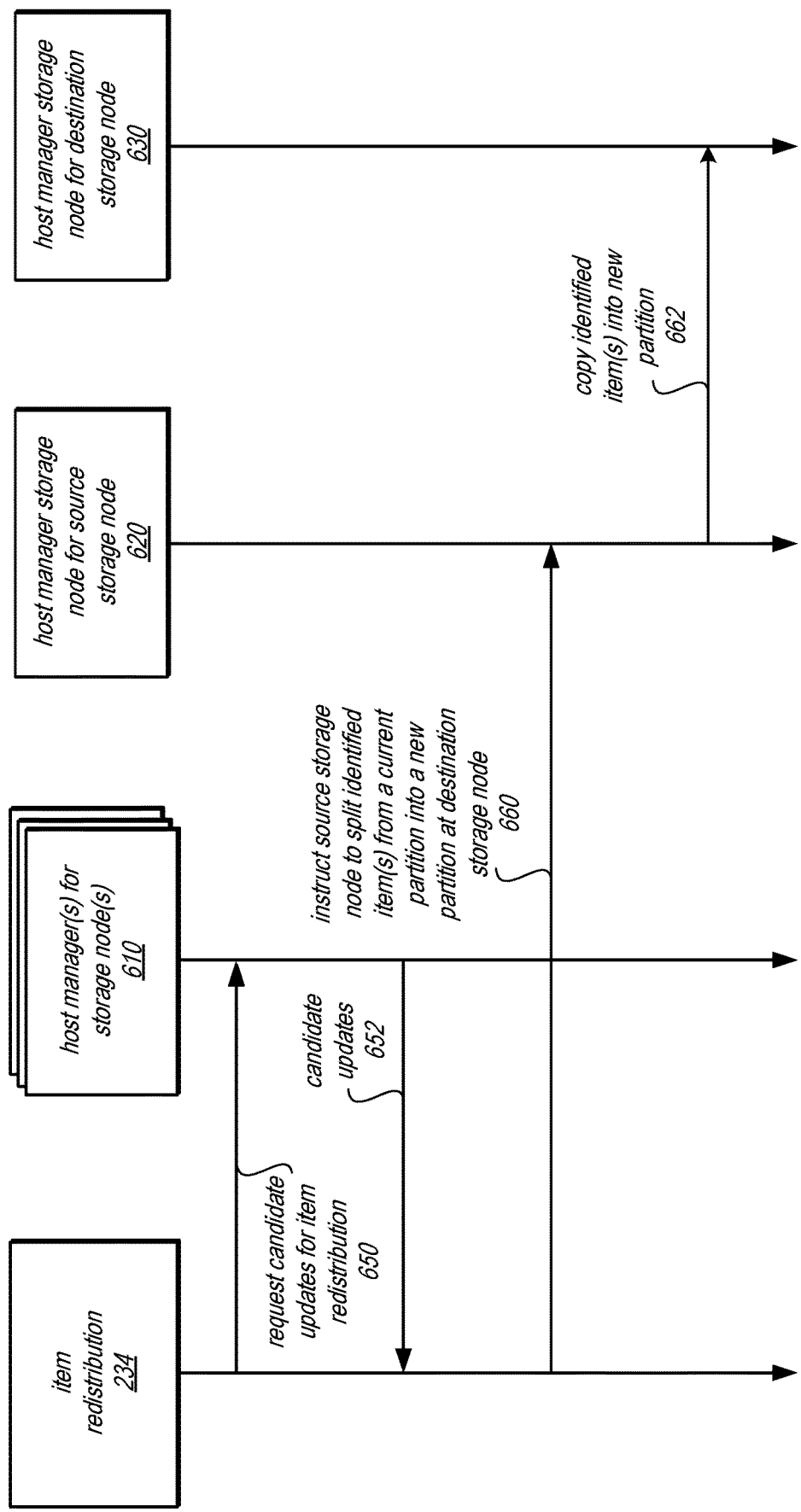
FIG. 6 is a sequence diagram illustrating interactions to split a partition, according to some embodiments.

FIG. 6 is a sequence diagram illustrating interactions to split a partition, according to some embodiments. Item redistribution feature 234 of control plane 230 may implement a pull-based technique for retrieving information to make partition movement decisions. For example, partition movement 236 may request candidate updates for item redistribution 650 from the host manager(s) of storage node(s) 610. However, in other embodiments, a push-based technique may be used to automatically provide resource utilization information. Host manager(s) for storage node(s) 610 may perform various techniques to identify whether a partition could be beneficially split, such as by applying the techniques discussed below with regard to FIG. 8. Although discussed as splitting a partition, in some embodiments, non-contiguous items (e.g., not a range of item key values) may be moved as part of a split so that a partition split could move items with keys "1" "3" and "5" into partition A and items with keys "2" "4" "6" into partition B.

Host manager(s) for storage node(s) 610 may provide candidate updates 652 to item redistribution feature 234. Item redistribution feature 234 may perform various further techniques to filter, order, or otherwise arrange the performance of candidate updates to item distribution in tables (e.g., in terms of priority to make the most needed splits, to throttle or limit the number of splits performed by the service overall, etc.). Item redistribution feature 234 may then instruct 660 the host manager for source storage node 620 to split the identified items from a current partition into a new partition at destination storage node 630. Host manager for source storage node 620 may copy 662 the identified item(s) into a new partition (e.g., using a logical or physical copying technique). An update to request routing 210 (not illustrated) may indicate the change in location for the items.

Figure 7:
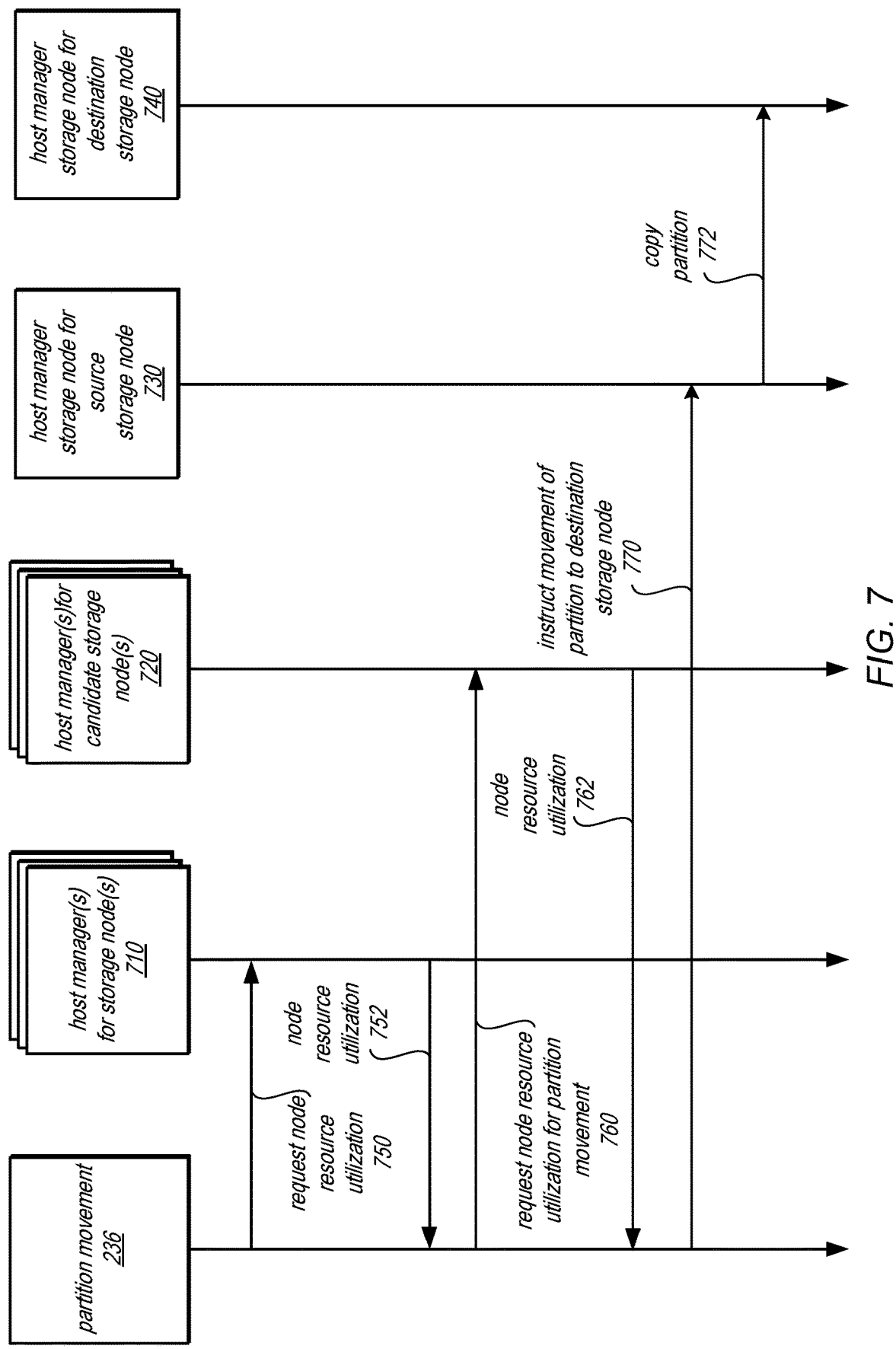
FIG. 7 is a sequence diagram illustrating interactions to move a partition, according to some embodiments.

FIG. 7 is a sequence diagram illustrating interactions to move a partition, according to some embodiments. Partition movement feature 236 of control plane 230 may implement a pull-based technique for retrieving information to make partition movement decisions. For example, partition movement 236 may request node utilization 750 from the host manager(s) of storage node(s) 710. However, in other embodiments, a push-based technique may be used to automatically provide resource utilization information. As indicated at 752, host manager(s) for storage for storage node(s) 710 may send collected utilization information. In some embodiments, partition movement 236 may request a specific feature or dimension of utilization information (e.g., partition with highest throughput utilization, number of partitions, throughput utilization per storage device, etc.).

Partition movement 236 may then identify from the resource utilization information those storage nodes that are candidates for move partition operation (e.g., by identifying outlier values amongst the utilization metrics). Partition movement 236 may send a request to host manager(s) for candidate storage node(s) 720 for further resource utilization information for partition movement 760. Further information that may be returned 762 could be breakouts or more detailed components of the higher level metrics reported in at 752 (e.g., which partitions on the node consume what IOPs, etc.).

Figure 11:
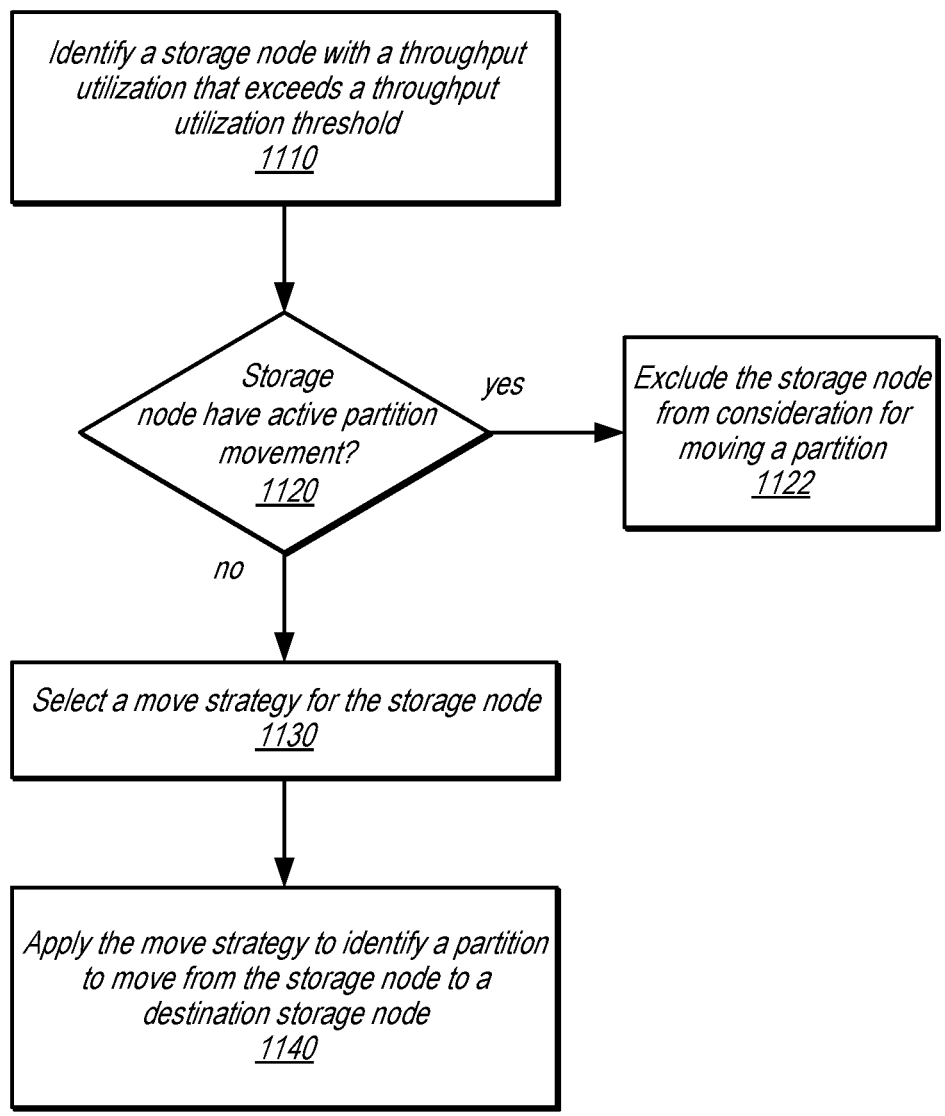
FIG. 11 is a high-level flowchart illustrating various methods and techniques to move partitions from one storage node to another storage node, according to some embodiments.

Partition movement 236 may select a partition for movement (e.g., according to the techniques discussed below with regard to FIG. 11), in some embodiments and then send a request 770 to instruct movement of the partition from storage node 730 to a destination storage node 740. Host manager for source storage node 730 may then initiate a transfer protocol to copy 772 the partition. For example, a physical copy technique to move data blocks using a file transfer protocol could be performed. In other embodiments, a snapshot of the partition could be loaded from a backup store (not illustrated) and changes to the snapshot replayed as a form of logical copying of the partition. Although not illustrated, partition movement 236 may update request routing 210 in order to ensure that requests for the partitions are routed to the destination storage node.

Figure 8:
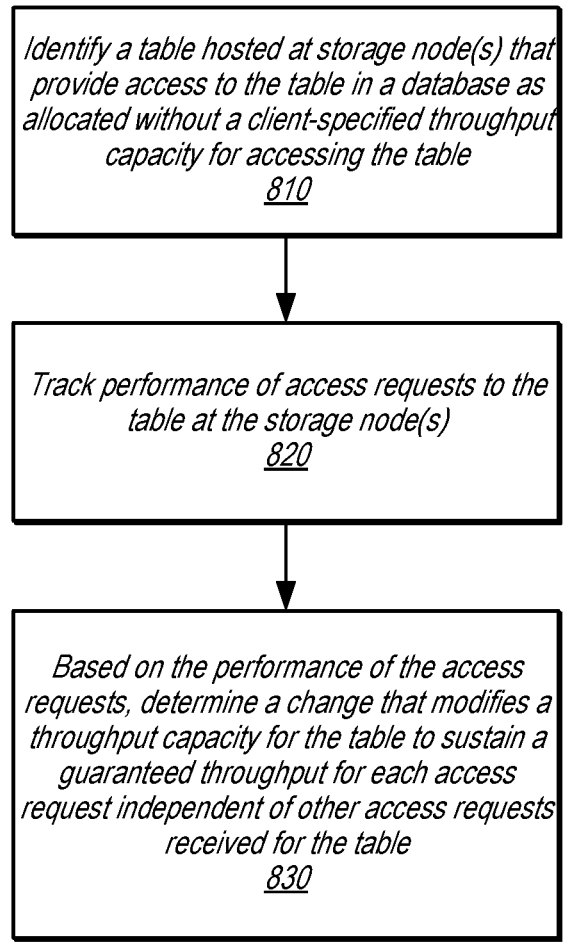
FIG. 8 is a high-level flowchart illustrating various methods and techniques to implement changing throughput capacity to sustain throughput for accessing individual items in a database, according to some embodiments.

The examples of changing throughput capacity to sustain throughput for accessing individual items in a database, according to some embodiments as discussed above in FIGS. 2-8 have been given in regard to a database service (e.g., a non-relational or NoSQL database service or a relational database service). However, various other types of database systems or data processing systems may implement changing throughput capacity to sustain throughput for accessing individual items in a database, in other embodiments. FIG. 8 is a high-level flowchart illustrating various methods and techniques to implement changing throughput capacity to sustain throughput for accessing individual items in a database, according to some embodiments. These techniques, as well as the techniques discussed with regard to FIGS. 9-11, may be implemented using components or systems as described above with regard to FIGS. 2-8, as well as other types of databases, storage engines, systems, or clients and thus the following discussion is not intended to be limiting as to the other types of systems that may implement the described techniques.

As indicated at 810, identify a table hosted at one or more storage nodes that provide access to the table in a database as allocated without a client-specified throughput capacity for accessing the table, in some embodiments. For example, a request to create the table may include no provisioned or otherwise specified capacity for throughput (or parameters that could impact or derive throughput, like storage size, storage type, etc.). In some embodiments, the request may be a request to convert or enable the table to be managed or hosted without a client-specified throughput capacity (e.g., changing from a client-specified throughput capacity which may or may not be automatically modified as discussed above with regard to FIGS. 4A-4C). To identify the table, various database system metadata or state information may be updated, tracking features or performance data collection may be enabled, and partition split and dynamic resource allocation may be enabled for the table, in some embodiments.

As indicated at 820, performance of access requests to the table may be tracked at the storage node(s), in some embodiments. For example, a performance collection agent may evaluate and update a utilization, latency, capacity, or other metrics for individual storage devices, individual partition replicas, and the storage node as a whole (which may host multiple partition replicas) for each received request (or a sample thereof), in some embodiments. Monitoring and other dynamic evaluations may occur, as discussed above with regard to FIGS. 5-8, to access the tracked performance information.

As indicated at 830, based on the performance of the access requests, a change may be determined that modifies a throughput capacity for the table to sustain a guaranteed throughput for each access request independent of other access requests received for the table. For example, instead of adjusting throughput capacity when a group of access requests or the table as a whole can no longer satisfy a performance guarantee for access requests (e.g., a guarantee not to throttling requests), then the change can anticipate or modify resource allocations before the throughput capacity is need or oversubscribed, as discussed below with regard to FIG. 9 and above with regard to FIG. 5, and/or modify the distribution of items by splitting items out of a partition into a new partition, as discussed below with regard to FIG. 10 and above with regard to FIG. 6. In this way, a table can be treated by a customer as a "serverless" resource, without regard to managing the database's workload.

Figure 9:
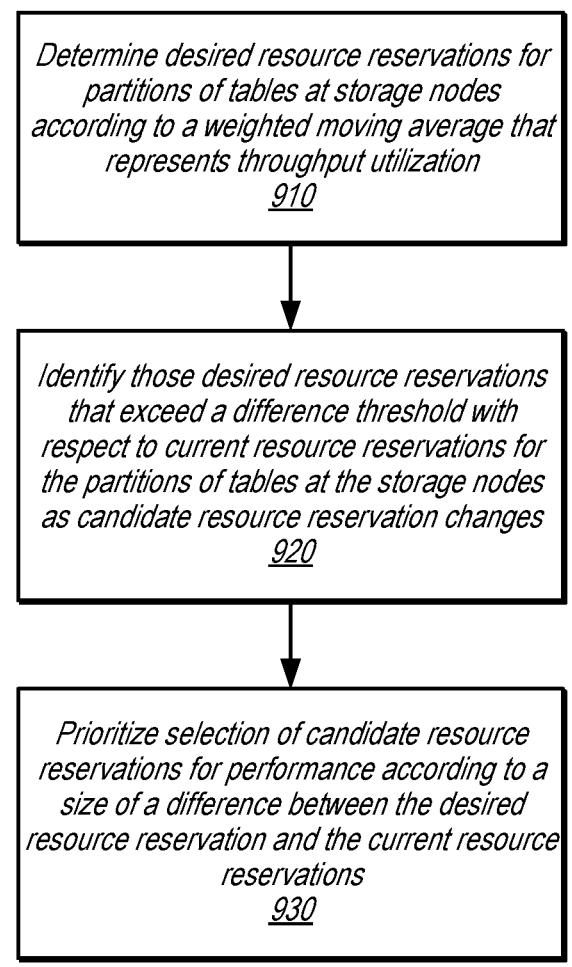
FIG. 9 is a high-level flowchart illustrating various methods and techniques to dynamically allocate resources for partitions of tables in a database, according to some embodiments.

FIG. 9 is a high-level flowchart illustrating various methods and techniques to dynamically allocate resources for partitions of tables in a database, according to some embodiments. As indicated at 910, desired resource reservations for partitions of tables at storage nodes may be determined according to a weighted moving average that represents throughput utilization of a partition of a table, in some embodiments. For example, a desired reservation amount may be determined from Max(Min(an exponential weighted moving average of IOPs utilization for a partition with a half-life of 600 sec*coefficient C, maximum IOPs a partition can support), a current minimum IOPs reservation to host the partition). Coefficient C may control the desired resource reservation availability (e.g., by raising or lowering the value of C).

As indicated at 920, those desired resource reservations that exceed a different threshold with respect to current resource reservations for the partitions at the storage nodes may be identified as candidate resource reservation changes, in some embodiments. For example, if the difference between desired and current reservation of a partition is more than a 10% increase, then the desired resource reservation may be considered a candidate. As indicated at 930, selection of candidate resource reservations may be prioritized for performance according to a size of a difference between the desired resource reservations and the current resource reservations, in some embodiments. In this way, those resource reservation changes with a greater need (e.g., a higher difference value) may be performed first so as not to fail to satisfy the performance guarantee for individual access requests.

Figure 10:
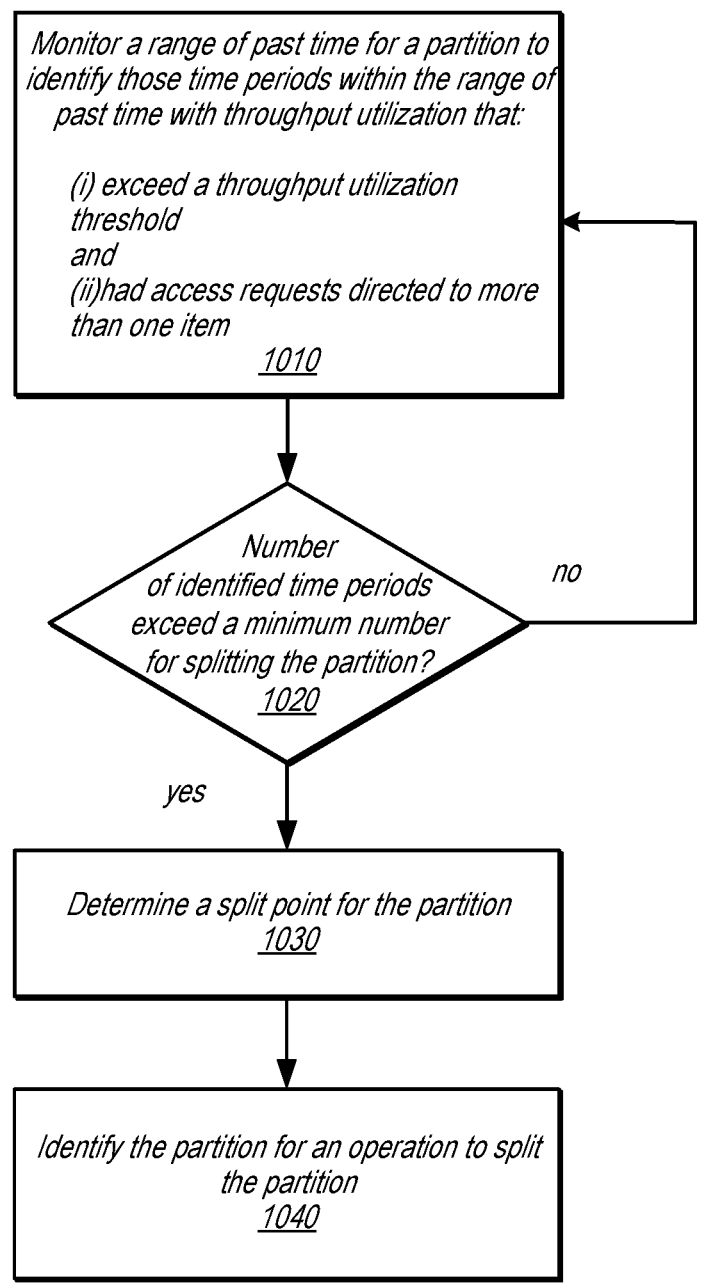
FIG. 10 is a high-level flowchart illustrating various methods and techniques to split and move a partition from one storage node to another, according to some embodiments.

FIG. 10 is a high-level flowchart illustrating various methods and techniques to split and move a partition from one storage node to another, according to some embodiments. As indicated at 1010, a range of past time for a partition may be monitored to identify those time periods within the range of past time with throughput utilization that (i) exceed a throughput utilization threshold and (ii) had access request directed to more than one item, in some embodiments. For example, a past range of time could be five minutes and time periods could be 1 second. The throughput utilization threshold could be some utilization threshold related to operations (e.g., 1500 IOPs) or a type (or mix of multiple types) of requests (e.g., greater than 50% write requests, or more write requests than read requests). Thus, continuing with the above example, the number of 1 second time periods in the last five minutes that accessed more than one item and had IOPs greater than 1500 may be counted.

As indicated at 1020, whether a number of identified time periods may exceeds a minimum number for splitting the partition may be determined, in some embodiments. For those ranges of time that do not have identified times exceeding the minimum number, then monitoring may continue, as indicated by the negative exit from 1020. The range of time could be a moving window so that older time periods are no longer monitored after passing out of the time window. In some embodiments, the range of time can be changed or throughput utilization thresholds could be changed to increase or decrease the sensitivity to detect splits for partitions.

As indicated at 1030, a split point may be determined for the partition, in some embodiments. For example, a key value for items in the partition may be identified and compared with the different identified time periods. If the key value would have lowered the throughput utilization of the identified time periods below the throughput utilization threshold number if applied (e.g., reduced the load on the split portions evenly or nearly evenly in 80% of time periods), then the split point may be selected. Different split points can be tried in order to satisfy the threshold number. In some embodiments, a split for the partition may not be performed if a split point cannot be identified that satisfies the threshold number. In some embodiments, a split point may identify different ranges of key values for items (e.g., keys 1-7,000 to partition A and 7,001 to 10,000 to partition B), whereas in other embodiments a split point may identify how one or more items (including individual items can be split out of a partition into a different partition). As indicated at 1040, the partition may then be identified for an operation to split the partition, in some embodiments. For example, the partition may be included in a response to a control plane feature that directs performance of split operations, as discussed above with regard to FIG. 6.

Moving partitions from one storage node to another may free up resources for other operations to change the throughput capacity for individual tables, as discussed above with regard to FIGS. 8-10. For example, moving partitions from a storage node experience high throughput utilization to low throughput utilization may allow that storage node to increase the allocation of resources to a remaining partition. FIG. 11 is a high-level flowchart illustrating various methods and techniques to move partitions from one storage node to another storage node, according to some embodiments.

As indicated at 1110, a storage node with a throughput utilization that exceeds a throughput utilization threshold may be identified, in some embodiments. For example, throughput utilization thresholds may be specified in terms of throughput, such as IOPs, and may be measured across different dimensions of a storage node. One dimension may be the overall throughput utilization of a storage node (e.g., a storage node is capable of 15,000 IOPs and between the multiple replicas hosted by the storage node, 13,000 IOPs are used). Another dimension may be storage device utilization (e.g., a storage drive is capable of providing 6,000 IOPs and 4,500 IOPs are used). Other criteria may be used in addition to or instead of selecting storage nodes based on throughput capacity utilization. For instance, a storage node could be selected based on the number of replicas hosted at the storage node. The throughput utilization threshold may be a threshold that identifies outlier storage nodes so the threshold may change from evaluation to evaluation as what constitutes an outlier may change (e.g., a storage node with 12,000 IOPs utilization could be the highest utilized node by 3,000 IOPs or only 100 more IOPs than the next 50 storage nodes).

As indicated at 1120, if an identified storage node has an active partition movement operation ongoing, then the storage node may be excluded from consideration for moving a partition. Metadata may track the status of ongoing partition movement operations and may be scanned or evaluated when a storage node is identified at 1110 in order to prevent the storage node from performing more than one partition movement. In other embodiments, a different threshold (e.g., two, three, or four ongoing partition movements may be the limit).

As indicated at 1130, a move strategy for the storage node may be selected, in some embodiments. One example of a move strategy is selecting a partition that is the most utilized but is a replica of partition also hosted at another storage node (e.g., a follower replica of a partition of a separately hosted leader replica of the partition). In some embodiments, the balancing strategy may select a lower utilized node (e.g., second-most utilized, etc.) in order to minimize the impact on the storage node when moving the partition. Selection of move strategy may be based on resource utilization or other features of the storage node (e.g., based on whether the workload of storage partitions are evenly distributed or involve a single highly utilized partition relative to other partitions). The move strategy may dependent on the dimension of the utilization that identified the storage node for movement.

As indicated at 1140, the move strategy may be applied to identify a partition to move from the storage node to a destination storage node, in some embodiments. For instance, the most utilized or second most utilized as specified by the move strategy may be identified and a task initiated (or queued for initiation) to move the specified partition from the storage host. A destination storage host may be identified based on various placement criteria that consider the effect of placing the partition at the destination host (e.g., cannot exceed a total utilization threshold, cannot be performing a move operation for a partition, cannot be receiving a new partition, etc.).

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 12:
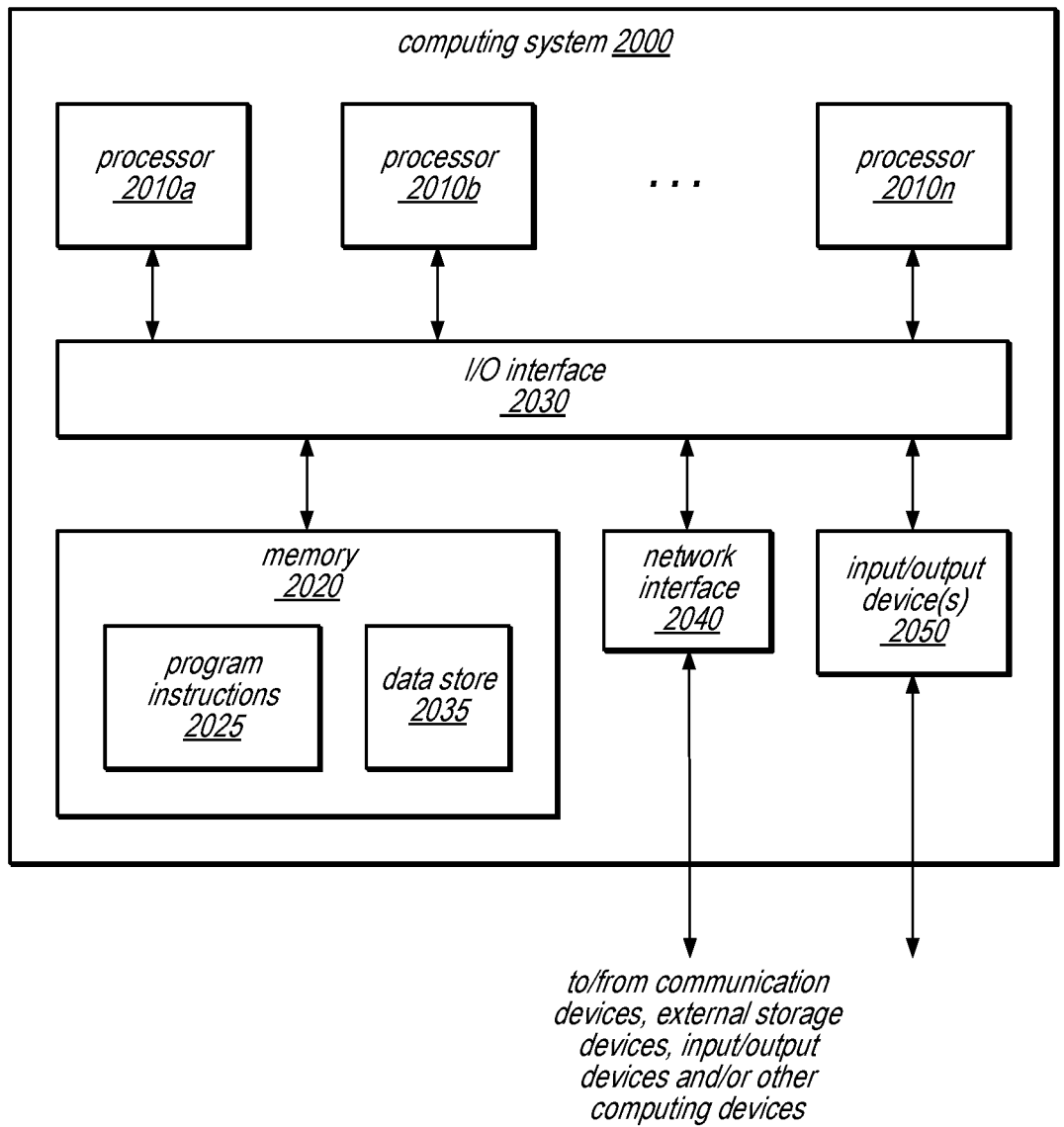
FIG. 12 is a block diagram illustrating an example computing system, according to some embodiments.

Embodiments of changing throughput capacity to sustain throughput for accessing individual items in a database as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s), in one embodiment.

System memory 2020 may be configured to store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 12, memory 2020 may include program instructions 2025, configured to implement the various embodiments of the systems as described herein, and data store 2035, comprising various data accessible by program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a first plurality of nodes, respectively comprising at least one processor and a memory that implement a plurality of storage nodes of a non-relational database service;
a second plurality of nodes, respectively comprising at least one other processor and another memory that implement a control plane for the non-relational database service, the control plane configured to:
receive, via an interface for the control plane, a request to create a table in the non-relational database without a specified throughput capacity for accessing the table, wherein the request without the specified throughput capacity, corresponds to one provisioning option;
responsive to the request to create the table in the non-relational database without the specified throughput capacity for accessing the table corresponding to the one provisioning option:
perform an initial allocation of resources at one or more storage nodes of the plurality of storage nodes in order to create the table in the non-relational database service, wherein the initial allocation of resources at the one or more storage nodes provides a throughput capacity for the table to sustain a throughput for individual access requests to the table;
enable dynamic allocation and item distribution for the table to proactively evaluate the initial allocation of resources at the one or more storage nodes, wherein to enable dynamic allocation and item distribution for the table, the control plane is configured to:
identify candidate updates to resource reallocation and item redistribution respectively at the one or more storage nodes wherein, the identifying includes:
determining a desired resource reservation for the table at each storage nodes according to a weighted moving average that represents a throughput utilization for the table at the respective node;
identifying those determined desired resource reservations that exceed a difference threshold with respective to current resource reservations at the respective storage nodes as the one or more candidate updates; and
assigning priorities to the identified candidate updates, wherein the priority of each identified candidate update correlates with a size difference between the desired resource reservation for the table and a current reservation for the table at the respective node;
based, at least in part, on respective priorities for the identified candidate updates, select and perform, the highest prioritized candidate update to cause a change of:
a redistribution of one or more items of the table by moving the one or more items from one of the one or more storage nodes to another storage node; or
creating a new allocation of resources for the table at one of the one or more storage nodes.

2. The system of claim 1, wherein the change is creating the new allocation of resources for the table at the one of the one or more storage nodes, and wherein the one or more storage nodes are configured to:
before the performance the change:
send an indication of the one storage node as the respective candidate update for resource reallocation to the control plane to be selected.

3. The system of claim 1, wherein the change is to the redistribution of the one or more items of the table, and wherein the one or more storage nodes are configured to:
detect for a number of time periods in a range of past time that exceed a minimum number for splitting a partition of the table that stores the one or more items, that each of the time periods:
had a throughput utilization that exceeded a throughput utilization threshold; and
had access requests directed to more than one item; and
determine a split point for the partition to move the one or more items to the other storage node; and
send an indication of the one storage node as the respective candidate update for partition split to the control plane.

4. The system of claim 1, wherein the control plane is further configured to:
before the performance the change:
identify the one storage node as having a throughput utilization that exceeds a throughput utilization threshold;
select a move strategy to identify data for another table to move from the one storage node; and
apply the move strategy to move the identified data to a different storage node.

5. A method, comprising:
receiving, via an interface of a control plane for a database service, a request to create a table in the database service without a specified throughput capacity for accessing the table, wherein the request without the specified throughput capacity corresponds to one provisioning option;
responsive to the request to create the table in the non-relational database without the specified throughput capacity for accessing the table corresponding to the one provisioning option:
performing, by the control plane, an initial allocation of resources at one or more storage nodes of the database service in order to create the table in the database service, wherein the initial allocation of resources at the one or more storage nodes provides a throughput capacity for the table to sustain a throughput for individual access requests to the table;
enabling, by the control plane, dynamic allocation and item distribution for the table to proactively evaluate the initial allocation of resources at the one or more storage nodes, wherein the enabling dynamic allocation and item distribution for the table comprises:
identifying candidate updates to resource reallocation and item redistribution respectively at the one or more storage nodes, wherein the identifying includes:
determining a desired resource reservation for the table at each storage nodes according to a weighted moving average that represents a throughput utilization for the table at the respective node;
identifying those determined desired resource reservations that exceed a difference threshold with respective to current resource reservations at the respective storage nodes as the one or more candidate updates;

assigning priorities to the identified candidate updates, wherein the priority of each identified candidate update correlates with a size difference between the desired resource reservation for the table and a current reservation for the table at the respective node; and based, at least in part, on respective priorities for the identified candidate updates, selecting and performing the highest prioritized candidate update to cause a change of:

a redistribution of one or more items of the table by moving the one or more items from one of the one or more storage nodes to another storage node; or creating a new allocation of resources for the table at one of the one or more storage nodes.

6. The method of claim 5, wherein the change is creating a new allocation of resources for the table at the one of the one or more storage nodes, and wherein the method further comprises:

before performance of the change:

sending, by the one storage node, an indication of the one storage node as the respective candidate update for resource reallocation to the control plane to be selected.

7. The method of claim 6, wherein the desired resource reservation is one of a plurality of desired resource reservations for a plurality of different tables hosted at a plurality of storage nodes including the one or more storage nodes.

8. The method of claim 5, wherein the change is the redistribution of the one or more items of the table, and wherein the method further comprises:

detecting, by the one storage node, for a number of time periods in a range of past time that exceed a minimum number for splitting a partition of the table that stores the one or more items, that each of the time periods:

had a throughput utilization that exceeded a throughput utilization threshold; and had access requests directed to more than one item;

determining, by the one storage node, a split point for the partition to move the one or more items to the other storage node; and sending, by the one storage node, an indication of the one storage node as the respective candidate update for partition split to the control plane to be selected.

9. The method of claim 8, further comprising:

before detecting the number of time periods in the range of past time that exceed the minimum number for splitting the partition of the table, evaluating an older range of past time where a number of time periods in the older range of past time did not exceed the minimum number for splitting the partition of the table.

10. The method of claim 8, wherein the detecting the number of time periods in the range of past time that exceed the minimum number for splitting the partition of the table and determining the split point for the partition are performed by the one storage node, and wherein the application of the change is performed responsive to a selection by the control plane of an operation submitted by the one storage node to perform the change.

11. The method of claim 5, further comprising:

before performance of the change:

identifying, by the control plane, the one storage node as having a throughput utilization that exceeds a throughput utilization threshold;

selecting, by the control plane, a move strategy to identify data for another table to move from the one storage node; and applying, by the control plane, the move strategy to move the identified data to a different storage node.

12. The method of claim 5, further comprising:

responsive to a request to disable dynamic allocation and item distribution for the table, disabling disable dynamic allocation and item distribution for the table.

13. One or more non-transitory, computer-readable storage media, storing program instructions that when executed on or across one or more computing devices cause the one or more computing devices to implement a control plane for a database service that implements:

receiving, via an interface of the control plane, a request to create a table in the database service at one or more storage nodes that provide access to the table as allocated without a client-specified throughput capacity for accessing the table, wherein the request without the specified throughput capacity corresponds to one provisioning option;

responsive to the request to create the table in the non-relational database without the specified throughput capacity for accessing the table corresponding to the one provisioning option:

performing an initial allocation of resources at one or more storage nodes of the database service in order to create the table in the database service, wherein the initial allocation of resources at the one or more storage nodes provides a throughput capacity for the table to sustain a throughput for individual access requests to the table;

enabling dynamic allocation and item distribution for the table to proactively evaluate the initial allocation of resources at the one or more storage nodes, wherein in enabling the dynamic allocation and item distribution for the table, the program instructions cause the one or more computing devices to implement:

identifying candidate updates to resource reallocation and item redistribution respectively at the one or more storage nodes, wherein the identifying includes:

determining a desired resource reservation for the table at each storage nodes according to a weighted moving average that represents a throughput utilization for the table at the respective node;

identifying those determined desired resource reservations that exceed a difference threshold with respective to current resource reservations at the respective storage nodes as the one or more candidate updates; and assigning priorities to the identified candidate updates, wherein the priority of each identified candidate update correlates with a size difference between the desired resource reservation for the table and a current reservation for the table at the respective node;

based, at least in part, on respective priorities for the identified candidate updates, selecting and performing the highest candidate update to cause a change of:

a redistribution of one or more items of the table by moving the one or more items from one of the one or more storage nodes to another storage node; or creating a new allocation of resources for the table at one of the one or more storage nodes.

14. The one or more non-transitory, computer-readable storage media of claim 13, wherein the change is the redistribution of the one or more items of the table, and wherein the selected candidate update is received from the one storage node, wherein the one storage node:
   detected for a number of time periods in a range of past time that exceed a minimum number for splitting a partition of the table that stores the one or more items, that each of the time periods:
      had a throughput utilization that exceeded a throughput utilization threshold; and
      had access requests directed to more than one item; and
   determined a split point for the partition to move the one or more items to the other storage node.

15. The one or more non-transitory, computer-readable storage media of claim 14, wherein the determination of the split point for the partition-includes evaluating whether the split would have lowered the throughput utilization in the time periods below the throughput utilization threshold if applied.

16. The one or more non-transitory, computer-readable storage media of claim 13, wherein the change is creating the new allocation of resources for the table at one of the one or more storage nodes.

17. The one or more non-transitory, computer-readable storage media of claim 16, wherein the determination of the desired resource reservation for the table at the one storage node according to the weighted moving average and the determination that the difference between the desired resource reservation for the table and the current reservation for the table at the one storage node exceeds the difference threshold, and wherein the application of the change is performed responsive to a selection by the control plane of an operation submitted by wherein, in causing the change to be applied for the table, the program instructions cause the one or more computing devices to implementing sending a request to the one storage node to perform the change.

18. The one or more non-transitory, computer-readable storage media of claim 13, wherein the one or more storage media further comprise program instructions that cause the one or more computing devices to further implement the control plane to implement:
   before causing performance of the change:
      identifying the one storage node as having a throughput utilization that exceeds a throughput utilization threshold;
      selecting a move strategy to identify data for another table to move from the one storage node; and
      applying the move strategy to move the identified data to a different storage node.

19. The one or more non-transitory, computer-readable storage media of claim 13, wherein the database service is a non-relational database service and wherein the control plane is a control plane for the non-relational database service.

* * * * *